United States Patent
Scharf et al.

(10) Patent No.: US 10,619,691 B2
(45) Date of Patent: Apr. 14, 2020

(54) UNIT BEARING ASSEMBLY

(71) Applicant: BOGE ELASTMETALL GMBH, Damme (DE)

(72) Inventors: Joerg Scharf, Eppenrod (DE); Juila Marktscheffel, Braunschweig (DE); Bernd Geisler, Meinersen (DE)

(73) Assignee: BOGE ELASTMETALL GMBH, Damme (DE)

( * ) Notice: Subject to any disclaimer, the term of this patent is extended or adjusted under 35 U.S.C. 154(b) by 360 days.

(21) Appl. No.: 15/504,129

(22) PCT Filed: Aug. 12, 2015

(86) PCT No.: PCT/EP2015/068535
§ 371 (c)(1),
(2) Date: Feb. 15, 2017

(87) PCT Pub. No.: WO2016/026745
PCT Pub. Date: Feb. 25, 2016

(65) Prior Publication Data
US 2017/0276201 A1    Sep. 28, 2017

(30) Foreign Application Priority Data

Aug. 18, 2014 (DE) .................. 10 2014 216 326

(51) Int. Cl.
*F16M 13/00* (2006.01)
*F16F 1/36* (2006.01)
(Continued)

(52) U.S. Cl.
CPC .............. *F16F 1/36* (2013.01); *F16F 1/3849* (2013.01); *F16M 13/02* (2013.01)

(58) Field of Classification Search
CPC .. F16F 1/46; F16F 1/3849; F16F 1/36; F16M 13/02
(Continued)

(56) References Cited

U.S. PATENT DOCUMENTS 9,708,555 B2 * 7/2017 Scharf ..................... C10L 3/003
10,131,219 B2 * 11/2018 Scharf .................. F16F 1/3849
10,203,012 B2 * 2/2019 Scharf .................. F16F 1/3849

FOREIGN PATENT DOCUMENTS

DE         10340443 A1   3/2005
DE     102010043165 A1   5/2012
(Continued)

OTHER PUBLICATIONS

International Search Report of PCT EP2015 068535, dated Dec. 7, 2015.
German Search Report of DE 102014216326.9, dated Jan. 30, 2015.

*Primary Examiner* — Todd M Epps
(74) *Attorney, Agent, or Firm* — Cohen & Hildebrand, PLLC (57) ABSTRACT

A unit bearing assembly (1) with an elastomer bearing body (2) in a rigid bearing housing (4) with an opening (3, 3'). A supporting member (5) takes hold through the opening (3, 3'), the supporting member braced on bearing body (2) and relative movements of the bearing body (2) with respect to the bearing housing (4) along three mutually orthogonal extension directions (X, Y, Z) of the bearing body (2), on both sides of a neutral position of each relative movement, is limited by stops (6, 6', 7, 7', 8, 8') arranged on the bearing housing (4). For providing a unit bearing assembly (1) with a stable, robust, and dimensionally stable bearing housing (4), and provides stops (6, 6', 7, 7', 8, 8') for movements the bearing housing (4) is designed free of joints and is molded in one piece in a forming process for receiving the bearing body (2).

13 Claims, 4 Drawing Sheets

(51) Int. Cl.
*F16F 1/38* (2006.01)
*F16M 13/02* (2006.01)

(58) Field of Classification Search
USPC .......................................................... 248/634
See application file for complete search history.

(56) References Cited

FOREIGN PATENT DOCUMENTS

| | | | |
|---|---|---|---|
| DE | 202013102202 U1 | 7/2013 | |
| DE | 102012106064 A1 | 2/2014 | |
| DE | 102012110480 A1 * | 5/2014 | ............ F16F 1/3849 |
| DE | 102012110480 A1 | 5/2014 | |
| FR | 2832477 A1 | 5/2003 | |
| FR | 2945093 A1 | 11/2010 | |

* cited by examiner

UNIT BEARING ASSEMBLY

This is an application filed under 35 USC § 371 of PCT EP2015/068535, filed on Aug. 12, 2015 claiming priority to DE 10 2014 216 326.9, filed on Aug. 18, 2014, each of which is herein incorporated by reference in its entirety.

BACKGROUND OF THE INVENTION

The invention relates to a unit bearing assembly with an elastomeric bearing body which is accommodated in a rigid bearing housing with an opening at least on one side, wherein at least one supporting member which is supported on the bearing body against the bearing housing passes through the at least one opening, and wherein relative movements of the bearing body with respect to the bearing housing caused by forces applied to the assembly along three mutually orthogonally extending directions of the bearing body on both sides of a neutral position of the respective relative movement can be limited by stops arranged on the bearing housing.

Such unit bearing assemblies are known and are used to limit movements caused by the motor which are transmitted via a supporting member to the bearing body of the assembly, wherein the occurring forces are dissipated at the linkages on the bodywork. They are used in large numbers especially in the field of automotive engineering, in particular for supporting the transmission. Simple embodiments of such bearings consist essentially of an elastomeric bearing body and a rigid bearing housing surrounding and accommodating the bearing body. When the bearings are used as intended, the respective bearing bodies move relative inside the bearing housing during the operation of a vehicle equipped with those bearing bodies due to the occurring loads. These relative movements of the bearing body must in this case be limited with regard to the respective possible excursions in the different directions. Therefore, the bearings are provided with stops which are formed by the bearing housing by virtue of a corresponding shape of the housing or are at least formed on the bearing housing by corresponding additional elements.

For use in automotive engineering, stops for the relative movements of the bearing body in the three main load directions are required. These stops limit the movement of the bearing body in the X direction, i.e. in the longitudinal direction of the vehicle, in the Y direction, i.e. transversely with respect to the longitudinal direction of the vehicle or the direction of travel, as well as in the Z direction, i.e. with respect to the vertical extent of the vehicle, both with respect to the respective positive as well as the corresponding negative component of the corresponding directional vector.

According to the state of the art, it is customary for implementing corresponding stops to design the bearing housing either in a multi-part fashion or to use for at least one direction of movement of the bearing body an external surface as a stop at the installation site of the bearing. In any case, the final assembly of the bearing, namely the insertion of the bearing body into the bearing housing, takes place in connection with the installation of the bearing at the installation site. In the first-mentioned case, when the unit bearing is installed, the housing parts of the unit bearing together with the bearing body are assembled with fastening elements, preferably screws, with which the bearing is secured at the installation site.

The prior art discloses solutions for such application, for example in DE 10 2010 043 165 A1, which rely on bearing housings composed of several parts for limiting in the three spatial directions the movements transmitted by the supporting member to the bearing body. When assembling the several parts of the bearing housing, at least one joining or assembling process must be carried out in order to limit movements of damping elements arranged on the supporting member in three spatial directions.

It is therefore the object of the present invention to provide a unit bearing assembly with a stable, robust and dimensionally stable bearing housing, which has high ductility and provides stops for a supporting member engaging in the unit bearing assembly to limit movements in three spatial directions.

BRIEF SUMMARY OF THE INVENTION

The problem is solved with a unit bearing assembly of the aforedescribed type, wherein the bearing housing is designed without any joints and can be formed in a forming process as a one-piece part for accommodating the bearing body, i.e. with an arrangement according to the features of patent claim 1. According to the solution of the problem, a bearing housing formed in a forming process, for example a drawn pot, essentially forms the basis for the unit bearing assembly. Due to the inherent one-piece construction, without subsequently introduced joints, this bearing housing satisfies the requirements for stability and robustness. At the same time, all functional dimensions and limitations for the rubber metal parts which form the stops for the movements on the supporting member or the bearing body can be formed on the aforementioned one-piece pot. This is possible by virtue of the interplay between the functional surfaces of the supporting member and the housing pot.

It is therefore in principle possible to manufacture a fully functioning transmission bearing with travel limitations in all directions with only two metal components. Any other attachments serve in this case to further increase in strength or to provide additionally needed add-on components or attachments, wherein a subsequent arrangement of additional components, for example by welding, does not change the previously provided geometry of the housing pot. The essential difference to the state of the art is that the bearing housing is produced from a single component of a production process and offers all functions relevant for the damping function. A drawn pot as produced, which may subsequently be stamped in a follow-on composite tool, can already provide all the functional surfaces necessary for its function.

Advantageous developments and/or refinements this assembly-bearing assembly are recited in the dependent claims.

In an advantageous embodiment of the unit bearing assembly according to the invention which can be produced with little effort, the bearing housing essentially forms a hollow profile forming a through-hole with two opposing openings, which in particular have the same cross-section and between which a housing wall of the bearing housing extends as a frame that encloses the through-hole.

Another advantageous embodiment of the assembly-bearing assembly, which has improved handling, already includes the functional surfaces of the bearing housing to be formed, which therefore do not have to be subsequently connected to the housing part. At least one edge region is formed on at least one of the openings of the bearing housing representing at least one surface section which is articulated on the frame of the bearing housing and can be permanently pivoted at least partially with respect to the frame once or several times. The edge region in question is a section which is part of the structure of the part from which the pot has previously been formed. The functional surfaces thus belong to the same structure as the housing part. With respect to the functional surfaces of the pot designed as stops, the frame of the bearing housing can form a stop for the Z direction, for example, with two opposing sections of its inner side. On the other hand, a stop for the Y-direction may be formed by a single-fold or multiple-folded surface section, which extends transversely to the housing wall of the bearing housing into the inlet opening of the bearing housing. With respect to the forming process, this surface section previously formed at least one area of the bottom of the pot and now projects in the operative position transversely to the edge of the opening in the direction of the supporting member in order to then engage with a section having a groove.

In an advantageous further embodiment of the unit bearing assembly according to the invention, the at least one surface section may be designed as part of a securing means of the bearing housing or as a stop of the supporting member on the bearing housing, so that the unit bearing assembly can advantageously be readily and securely fastened to the vehicle body with the aid of a surface section, or the unit bearing assembly itself forms a functional surface for limiting movements along an extension direction.

In another embodiment of the unit bearing assembly, the torsional rigidity of the bearing housing designed as a pot can be improved by assigning at least one, in particular U-shaped insertion part to the bearing housing, which bears with its base and legs in the operating position against three sides of the bearing housing at least over a portion of the respective side length. The insertion part can, for example, be designed as a substantially two-dimensional punched plate.

In an advantageous embodiment, at least one side face of the insertion part may support an end face of one of the surface sections of the bearing housing that is pivoted on the bearing housing, so that the respective surface section which is for example bolted to the vehicle body part, ensures that the absorbed forces are reliably introduced.

In an advantageous embodiment of the unit bearing assembly, which is able to dissipate quickly and effectively the forces acting on the unit via the supporting member, the supporting member engages with the bearing housing in an insertion direction along the longitudinal axis of the through-hole of the bearing housing.

In an advantageous embodiment of the unit bearing assembly, in order to arrange the end of the supporting member in a suitable manner on the bearing body and to ensure a reliable force introduction, the supporting member may have on its end facing the bearing body a profile that engages with the bearing body on at least three sides, wherein a middle side of these sides is completely covered along its extension direction. For example, the bearing body may here be a six-faced polyhedron, with one of the faces completely enclosed by the profile of the supporting member, wherein the profile also engages to a greater or lesser extent at the edges of the enclosed face so that the bearing body engages in a kind of recess of the profile.

In a further advantageous embodiment of the unit bearing assembly, the supporting member has a U-shaped section with legs arranged, in the neutral position of one of the directions of movement, on both sides of a surface section of the bearing housing that forms a stop for this direction of movement. The U-shaped section thus forms a groove with side walls that are in at least indirect abutment with the surface section when the supporting member is deflected from the neutral position in the respective direction of movement, so that the surface section provides a stop for the movement along this direction. This may be, for example, the aforedescribed Y-direction.

With respect to the movements transmitted by the supporting member to the bearing body or the bearing housing, it may be advantageous in another embodiment of the unit bearing assembly to arrange at least one of the stops, in particular several stops for limiting the movement on the bearing housing in front of the bearing body, as viewed from the direction of the unit, so that the respective lever arm can be made smaller.

In another embodiment, at least one opening may be provided on the frame of the bearing housing, with which at least one fastening element connected to the bearing body at least engages, for securely positioning the bearing body on the bearing housing. This ensures that the support spring assumes its correct position in the bearing housing in the operating position. However, the fastening element may also completely extend through the opening.

In other advantageous embodiments, the unit bearing assembly may be constructed of a deep-drawn steel sheet, but may also be formed from an extruded aluminum profile having the required ductility for suitably supporting, for example, a motor vehicle transmission.

BRIEF DESCRIPTION OF THE DRAWINGS

Exemplary embodiments of the invention will now be described in more detail below with reference to the drawing. In a partial schematic representation.

DETAILED DESCRIPTION OF THE INVENTION

FIGS. 1 to 5 and 9 show a unit bearing assembly having the overall designation 1, with an elastomeric bearing body 2 which is accommodated in a rigid bearing housing 4 having at least on one side an opening, with a supporting member 5 that is not connected with the respective unillustrated unit and extends through the opening 3. The supporting member 5 is supported on the bearing body 2 against the bearing housing 4. The relative movements of the bearing body 2 against the bearing housing 4 caused by the forces acting on the unit along three mutually orthogonal extension directions X, Y, Z of the bearing body 2 on both sides of a neutral position of the respective relative movement can be limited by stops 6, 6', 7, 7', 8, 8' arranged on the bearing housing. The unit bearing assembly is distinguished from the prior art in that the bearing housing 4 is constructed without any joints and can be formed in a forming process as one piece for accommodating the bearing body 2.

As can be easily seen, the bearing body 2 has a quadrangular cross-section and is accommodated in a through-hole 15 formed by the housing wall 11 of the bearing housing 4 extending between the two opposing openings 3, 3'. The through-hole 15 is thereby enclosed by the housing wall 11 of the bearing housing 4.

It is also evident that on the opening 3' of the bearing housing 4 that faces the observer in FIGS. 2, 3, 5 and 9, an edge region is formed with a plurality of surface section s 12, 12', wherein the edge region is arranged opposite the housing wall 11 of the bearing housing 4 and is articulated and can be pivoted or is pivoted on the housing wall 11. In this case, the surface sections 12, 12' form part of a securing part of the bearing housing 4, since a screw connection with a body part can be implemented at each of the fastening openings 13. The aforementioned securing means is completed by the articulated arm 9 arranged on the outer side of the bearing housing, so that the bearing housing 4 can be connected to vehicle body parts at three different points.

Another pivoted, quasi folded surface section is formed by the Y stop 7, 7', which partly formed the pot bottom in the forming process of the bearing housing 4.

Figure 4:
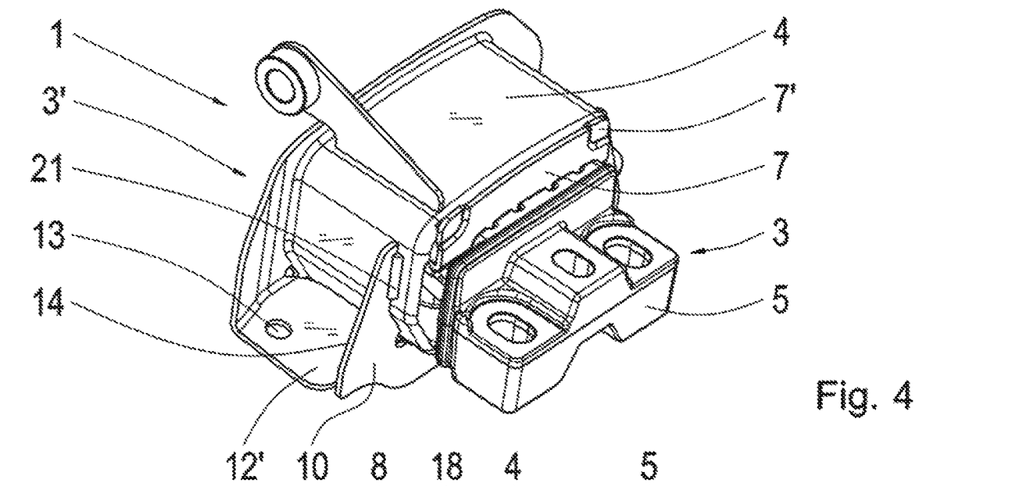
FIG. 4 shows a perspective side view of the unit bearing assembly from FIGS. 1 to 3 as seen from the rear direction.

FIGS. 2 to 5 and 9 also show a U-shaped insertion part 10 which is associated with and arranged on the bearing housing 4 and which bears with its base and its legs in the operating position against three sides of the bearing housing 4 over a portion of the respective side length. With its forwardly facing side surface 14, the insertion part 10 supports a respective end face of one of the pivoted surface sections 12, 12' of the bearing housing 4 and thus assists the force introduction via the surface sections 12, 17 by stiffening their construction. FIG. 4 shows that the rear side of the side surface 14 is supported against a projection 21 that is located on the outer housing wall 11 and extends transversely to the longitudinal axis of the through-hole 15.

FIGS. 1 to 5 and 9 show that the supporting member 5 engages with the bearing housing 4 in an insertion direction along the longitudinal axis of the through-hole 15 of the bearing housing 4. It is also evident that the supporting member 5 has on its end facing the bearing body 2 a profile 16 which engages the bearing body 2 on at least three sides, wherein a middle one of these sides is completely covered over its extension direction. Returning to FIG. 1, this figure only shows that the supporting member 5 has a U-shaped portion 17, with legs that are arranged in the neutral position of one of the directions of movement, namely the Y direction, on both sides of the surface section of the bearing housing 4 that forms a stop 7, 7' for these directions of movement.

Figure 1:
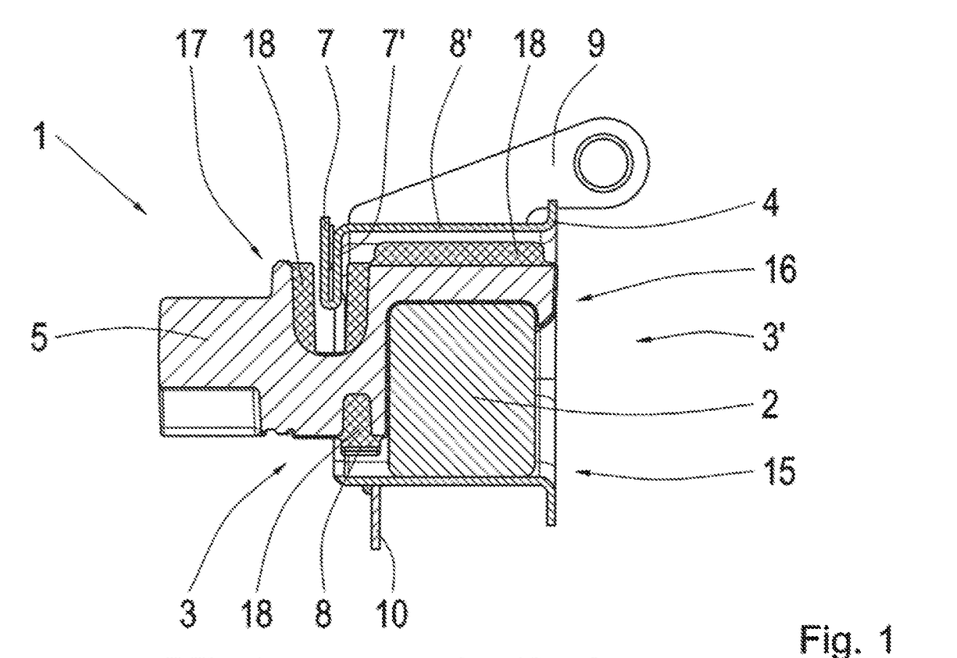
FIG. 1 shows a plan sectional side view of a first exemplary embodiment of the unit bearing assembly according to the invention with a bearing body, a bearing housing and a supporting member.
Figure 2:
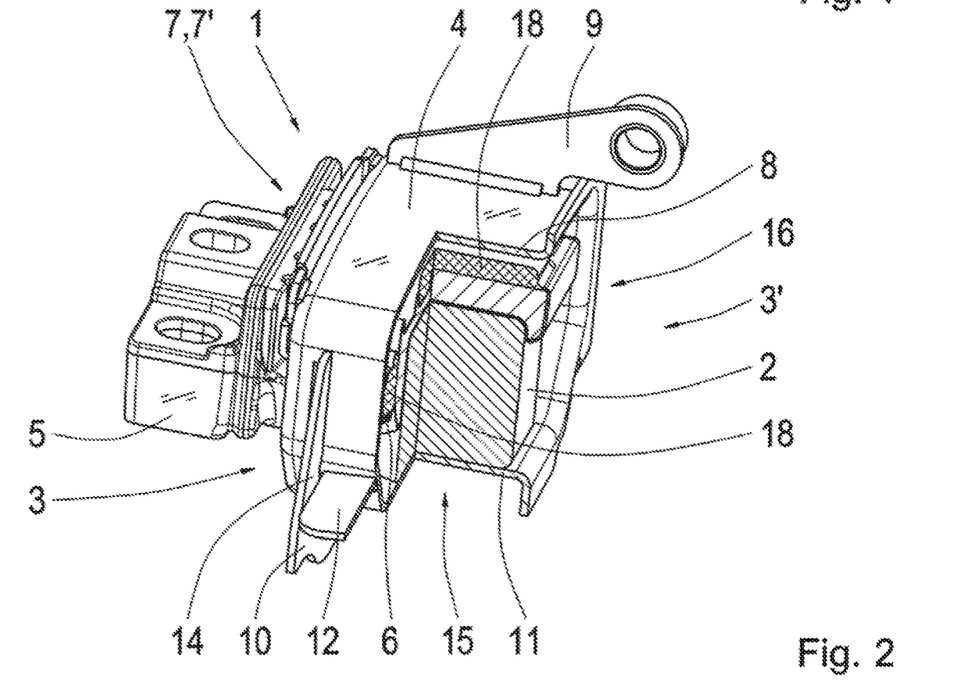
FIG. 2 shows a partially cut-away perspective side view the unit bearing assembly of FIG. 1 obliquely from above.
Figure 3:
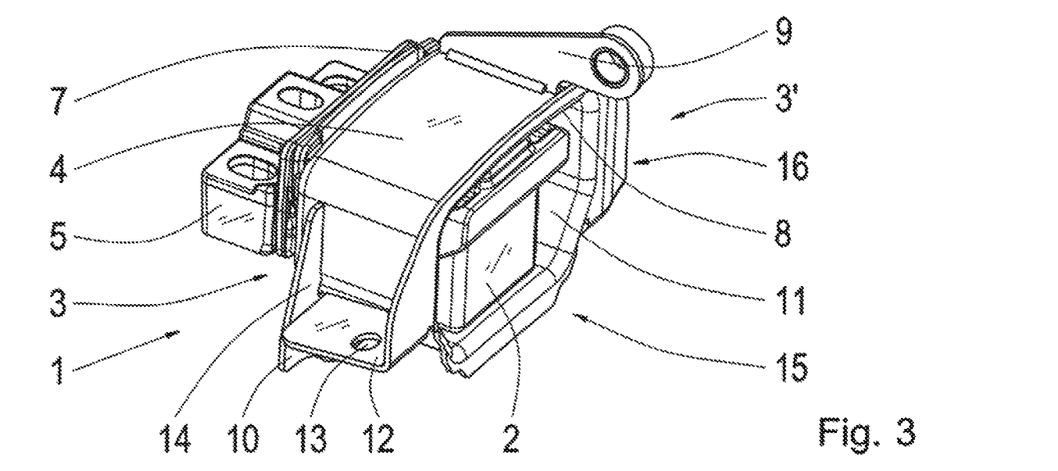
FIG. 3 shows an uncut perspective side view of the unit bearing assembly of FIG. 2.
Figure 5:
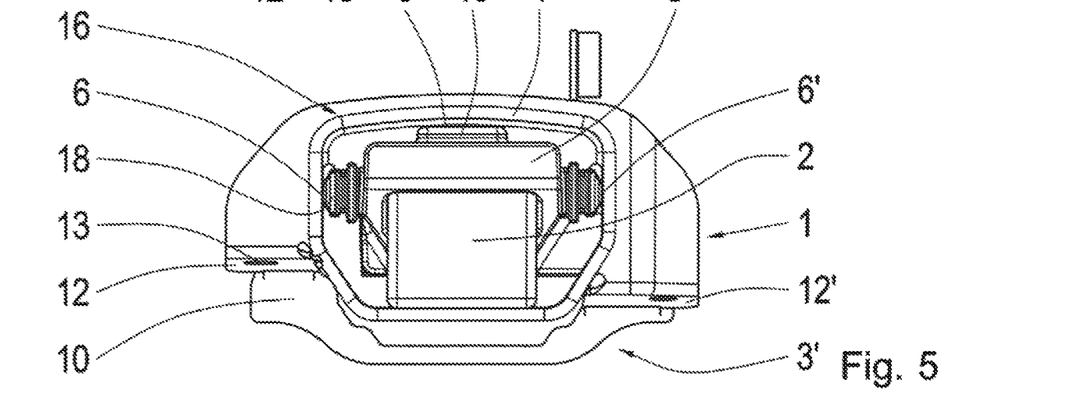
FIG. 5 shows a perspective front view of the unit bearing assembly from FIGS. 1 to 4 from the front below.

Overall, it is evident that when the supporting member is deflected out of its neutral position, the stops 6, 6', 7, 7', 8, 8' make contact with correspondingly positioned elastomer sections 18 which are connected to the supporting member 5 via rubber-metal joints, and which, with a suitable strong deflection, comes into contact with the stops 6, 6', 7, 7', 8, 8' formed by surface sections or regions of the housing wall 11. This situation can be seen particularly well in FIGS. 1, 2 and 5. The diagram of FIG. 5 shows very clearly the respective elastomer sections 18 in relation to the stops 6, 6' in the X direction. FIG. 1 also illustrates that several stops 7, 7', 8 for limiting the movement are arranged on the bearing housing 4 in front of the bearing body 2 as viewed from the direction of the unit.

Figure 9:
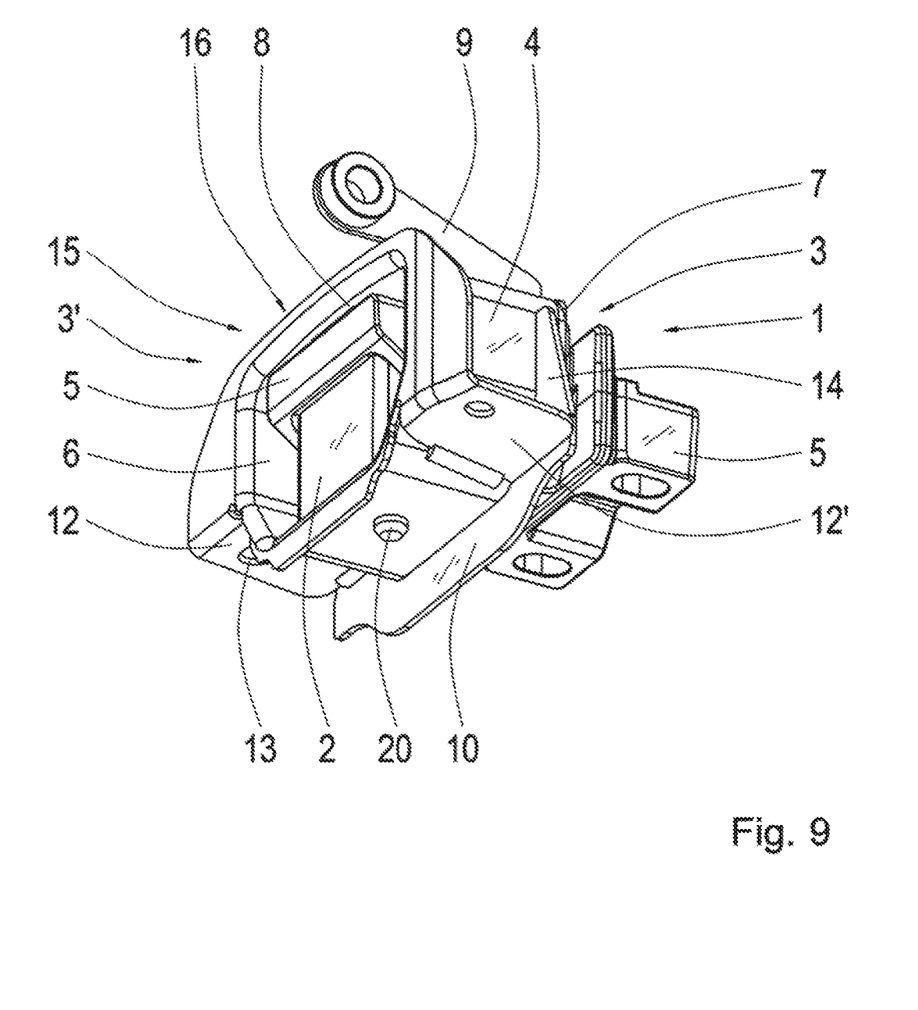
FIG. 9 shows a perspective side view obliquely from below of an exemplary embodiment of the unit bearing assembly with additional fastening means disposed between the bearing body and the bearing housing.

FIG. 9 shows an embodiment of the unit bearing assembly wherein a wall opening 20 is introduced into the housing wall 11 of the bearing housing 4. A fastening element that is connected to the bearing body 2 extends through the wall opening 20, thereby correctly positioning the bearing body with respect to the bearing housing 4.

Figure 6:
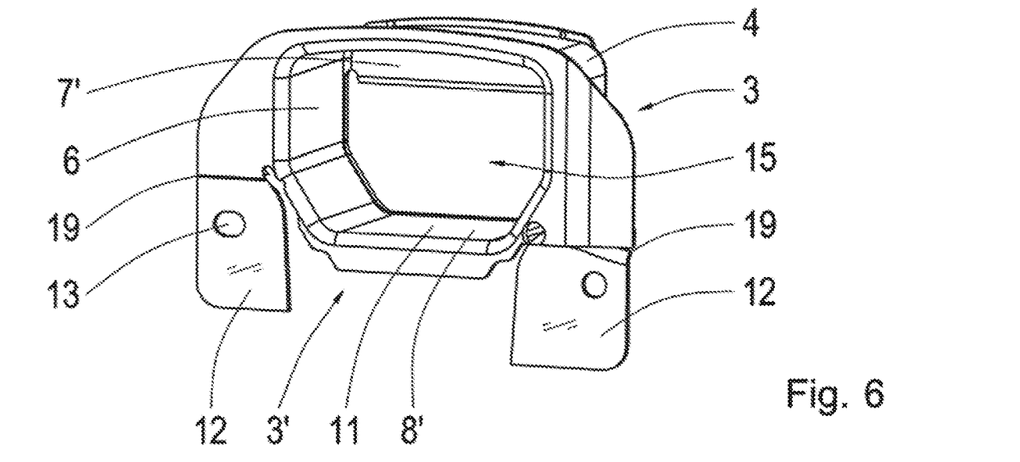
FIG. 6 shows a perspective side view obliquely from the right front of a bearing housing of a unit bearing assembly from the front with non-pivoted surface sections.
Figure 7:
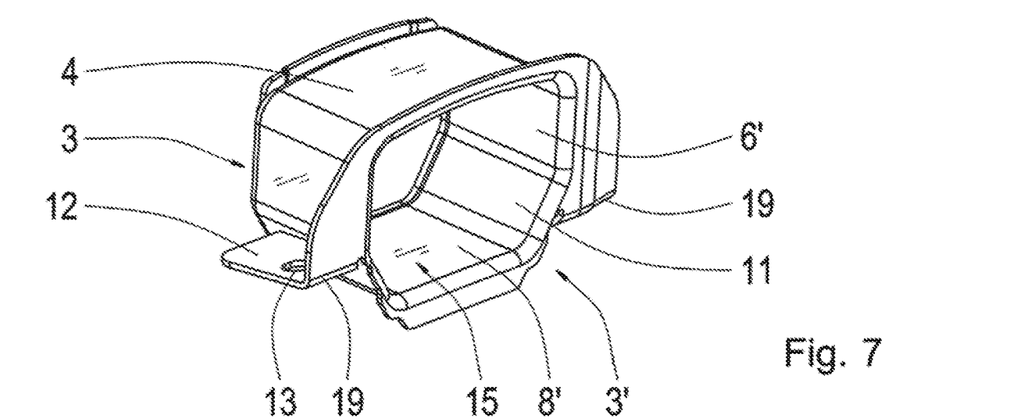
FIG. 7 shows a perspective side view obliquely from the left front of the bearing housing of FIG. 6 with pivoted surface sections.
Figure 8:
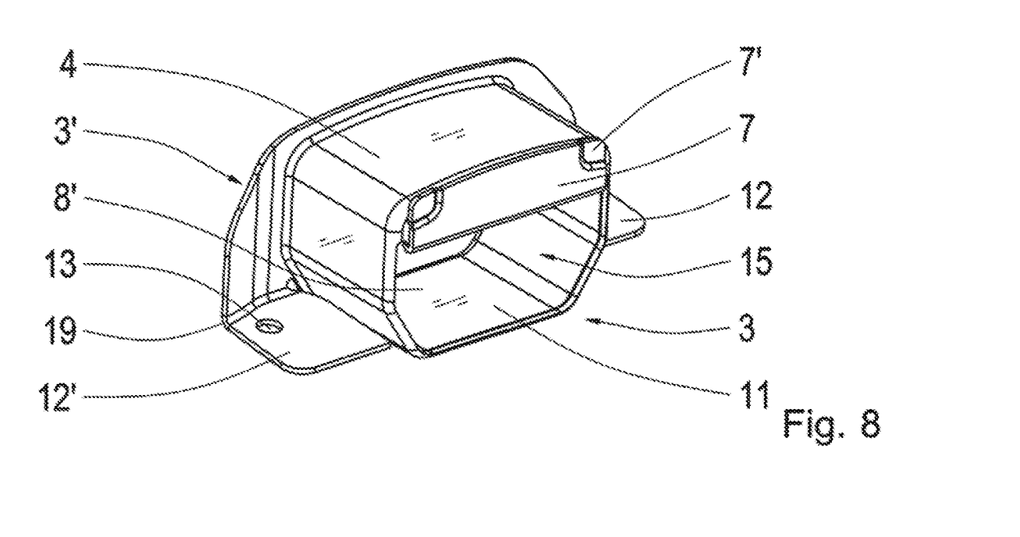
FIG. 8 shows a perspective side view obliquely from the right rear of the bearing housing of FIG. 7.

FIGS. 6 to 8 show only the pot-shaped bearing housing 4, in which a through-hole 15 is formed, which extends between the openings 3, 3' of the bearing housing 4 and is enclosed by the housing wall 11. It is also evident that edge regions protrude transversely outwardly from the edge of the opening 3', wherein the in FIG. 6 lower regions of the edge regions, as seen by an observer, can be pivoted about a swivel seam 19 so as to then form the surface sections 12, 12' with the mounting openings 13, as seen in FIG. 7. FIGS. 6 to 8 show particularly clearly the design of the through-hole cross-section of the pot-shaped bearing housing 4, which has, with reference to FIG. 6, a slightly outwardly curved roof area which transitions at rounded corners into straight side sections which are slightly tapered towards one another at their lower end and then terminate again with a rounded shape in a flat bottom region. FIG. 8 shows once more in particular the stop 7, 7', which is formed by a region of the former bottom of the drawn pot from which the bearing housing 4 has been formed. The portion of the stop 7 is hereby pivoted upward by 180° and previously formed the base region approximately to the height where the cross-section of the bearing housing 4 tapers.

Accordingly, the above-described invention relates to a unit bearing assembly 1 with an elastomeric bearing body 2, which is accommodated in a rigid bearing housing 4 having an opening 3, 3' on at least on one side. At least one supporting member 5, which is supported on the bearing body 2 against the bearing housing 4, extends through the at least one opening 3, 3', wherein stops 6, 6', 7, 7', 8, 8' arranged on the bearing housing 4 are configured to limit the relative movements of the bearing body 2 caused by forces acting on the assembly relative to the bearing housing 4 along three mutually orthogonal extension directions X, Y, Z of the bearing body 2 on both sides of a neutral position of the respective relative movement. In order to provide a unit bearing assembly 1 with a stable, robust and dimensionally stable bearing housing 4, which has high ductility and provides a supporting member 5 engaging therewith stops 6, 6', 7, 7', 8, 8' for movements in three spatial directions X, Y, Z, the bearing housing 4 is designed without any joints and can be formed in a forming process as one piece for accommodating the bearing body 2.

REFERENCE SYMBOLS 1 unit bearing assembly
2 bearing body
3, 3' opening
4 bearing housing
5 supporting member
6, 6' stop X-direction
7, 7' stop Y-direction
8, 8' stop Z-direction
9 articulated arm
10 insertion part
11 housing wall
12, 12' surface section 13 mounting opening
14 side face insertion part
15 through-hole
16 end profile supporting member
17 U-shaped portion of the supporting member
18 elastomer section
19 swivel seam
20 wall opening
21 projection

The invention claimed is:

1. A unit bearing assembly with an elastomeric bearing body (2) which is accommodated in a rigid bearing housing (4) comprising:
at least one side of the bearing housing (4) having an opening (3, 3'), wherein at least one supporting member (5) which is supported on the bearing body (2) against the bearing housing (4) extends through the at least opening (3, 3'), wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4),
wherein the bearing housing (4) is designed without any joints and is formed in a forming process as one piece for accommodating the bearing body (2),
wherein the bearing housing (4) essentially forms a hollow profile with a through-hole (15) formed by two opposing openings (3, 3').

2. The unit bearing assembly according to claim 1, wherein the two opposing openings (3, 3') have an identical cross-section and between which a housing wall (11) of the bearing housing extends in form of a frame, with the frame enclosing the through-hole (15).

3. The unit bearing assembly according to claim 1, wherein at least one edge region in form of at least one surface section (12, 12') is formed on the at least one opening (3, 3'), wherein the at least one surface section (12, 12') is articulatable with respect to a housing wall (11) of the bearing housing (4).

4. The unit bearing assembly according to claim 3, wherein the at least one surface section (12, 12') is designed as part of a securing part of the bearing housing (4) or as a stop (6, 6', 7, 7', 8, 8') of the supporting member (5) on the bearing housing (4).

5. The unit bearing assembly according to claim 3, wherein the at least one surface section (12, 12') is permanently pivotable once or several times at least in sections.

6. A unit bearing assembly with an elastomeric bearing body (2) which is accommodated in a rigid bearing housing (4) comprising:
at least one side of the bearing housing (4) having an opening (3, 3'),
wherein at least one supporting member (5) which is supported on the bearing body (2) against the bearing housing (4) extends through the at least opening (3, 3'),
wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4),
wherein the bearing housing (4) is designed without any joints and is formed in a forming process as one piece for accommodating the bearing body (2),
wherein at least one U-shaped insertion part (10) having a base and legs is associated with the bearing housing (4), with the base and the legs of the insertion part (10) making contact with three sides of the bearing housing (4) at least over part of a respective side length in an operating position.

7. The unit bearing assembly according to claim 6, wherein at least one side surface of the insertion part (10) supports an end face of one of the pivoted surface sections (12, 12') of the bearing housing.

8. A unit bearing assembly with an elastomeric bearing body (2) which is accommodated in a rigid bearing housing (4) comprising:
at least one side of the bearing housing (4) having an opening (3, 3'), wherein at least one supporting member (5) which is supported on the bearing body (2) against the bearing housing (4) extends through the at least opening (3, 3'),
wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4),
wherein the bearing housing (4) is designed without any joints and is formed in a forming process as one piece for accommodating the bearing body (2),
wherein the supporting member (5) engages in the bearing housing (4) along an insertion direction along a longitudinal axis of a through-hole (15) of the bearing housing (4).

9. A unit bearing assembly with an elastomeric bearing body (2) which is accommodated in a rigid bearing housing (4) comprising:
at least one side of the bearing housing (4) having an opening (3, 3'),
wherein at least one supporting member (5) which is supported on the bearing body (2) against the bearing housing (4) extends through the at least opening (3, 3'),
wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4),
wherein the bearing housing (4) is designed without any joints and is formed in a forming process as one piece for accommodating the bearing body (2),
wherein an end of the supporting member (5) facing the bearing body (4) has a profile (16), which engages with the bearing body (4) on at least three sides, wherein a middle of these sides is completely covered along its extension direction.

10. A unit bearing assembly with an elastomeric bearing body (2) which is accommodated in a rigid bearing housing (4) comprising:
at least one side of the bearing housing (4) having an opening (3, 3'),
wherein at least one supporting member (5) which is supported on the bearing body (2) against the bearing housing (4) extends through the at least opening (3, 3'),
wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4), wherein the bearing housing (4) is designed without any joints and is formed as one piece for accommodating the bearing body (2), wherein the supporting member (5) has a U-shaped section (17), with the legs of the U-shaped section (17) arranged in a neutral position of one of the directions of movement (X, Y, Z) on both sides of a surface section of the bearing housing (4) to form a stop (6, 6', 7, 7', 8, 8') for this direction of movement (X, Y, Z).

11. A unit bearing assembly with an elastomeric bearing body (2) which is accommodated in a rigid bearing housing (4) comprising:

at least one side of the bearing housing (4) having an opening (3, 3'), wherein at least one supporting member (5) which is supported on the bearing body (2) against the bearing housing (4) extends through the at least opening (3, 3'), wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4), wherein the bearing housing (4) is designed without any joints and is formed in a forming process as one piece for accommodating the bearing body (2), wherein at least one of the stops (6, 6', 7, 7' 8, 8') for limiting the movement is arranged on the bearing housing (4) forward of the bearing body (2), as seen from a direction of the unit.

12. The unit bearing assembly according to claim 11, wherein the at least one of the stops are several stops (6, 6', 7, 7' 8, 8') for limiting the movement.

13. A unit bearing assembly with an elastomeric bearing body (2) which is accommodated in a rigid bearing housing (4) comprising:

at least one side of the bearing housing (4) having an opening (3, 3'), wherein at least one supporting member (5) which is supported on the bearing body (2) against the bearing housing (4) extends through the at least opening (3, 3'), wherein force-induced relative movements of the bearing body (2) in relation to the bearing housing (4) along three mutually orthogonal extension directions (X, Y, Z) of the bearing body (2) on both sides of a resting position of the respective relative movement are limited by stops (6, 6', 7, 7', 8, 8') arranged on the bearing housing (4), wherein the bearing housing (4) is designed without any joints and is formed in a forming process as one piece for accommodating the bearing body (2), wherein at least one wall opening (20), in which at least one fastening element connected to the bearing body (2) at least engages, is provided on a housing wall (11) of the bearing housing (4).

* * * * *